(12) United States Patent
Go et al.

(10) Patent No.: US 11,679,817 B2
(45) Date of Patent: Jun. 20, 2023

(54) FOLDING TAILGATE FOR A VEHICLE

(71) Applicants: Hyundai Motor Company, Seoul (KR); Kia Corporation, Seoul (KR)

(72) Inventors: Ronnie Go, Warren, MI (US); David W. Curtis, South Lyon, MI (US); Traven Thai, Royal Oak, MI (US)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 65 days.

(21) Appl. No.: 17/400,725

(22) Filed: Aug. 12, 2021

(65) Prior Publication Data
US 2023/0046429 A1 Feb. 16, 2023

(51) Int. Cl.
*B62D 33/027* (2006.01)

(52) U.S. Cl.
CPC .................. *B62D 33/0273* (2013.01)

(58) Field of Classification Search
CPC . B62D 33/027; B62D 33/0273; B62D 33/037
See application file for complete search history.

(56) References Cited

U.S. PATENT DOCUMENTS

| | | | |
|---|---|---|---|
| 5,954,383 A * | 9/1999 | Beck | B62D 33/0273 296/57.1 |
| 6,196,609 B1 * | 3/2001 | Bowers | B62D 33/0273 296/57.1 |
| 6,550,840 B2 * | 4/2003 | Rayburn | B60P 1/438 296/61 |
| 8,136,862 B2 | 3/2012 | Bator et al. | |
| 2003/0122396 A1 * | 7/2003 | Humphrey | B62D 33/0273 296/51 |
| 2008/0100084 A1 * | 5/2008 | Ohly | B62D 33/0273 296/57.1 |
| 2011/0089711 A1 * | 4/2011 | Zielinsky | B62D 33/0273 296/57.1 |
| 2016/0236724 A1 | 8/2016 | Borges Filho et al. | |
| 2021/0245817 A1 * | 8/2021 | Gibbs | B62D 33/0276 |
| 2021/0253180 A1 * | 8/2021 | Selle | B62D 33/0273 |
| 2021/0387680 A1 * | 12/2021 | Parker | B62D 33/0273 |
| 2023/0046429 A1 * | 2/2023 | Go | B62D 33/037 |

FOREIGN PATENT DOCUMENTS

EP 1 215 107 B1 7/2004

* cited by examiner

*Primary Examiner* — Gregory A Blankenship
(74) *Attorney, Agent, or Firm* — Fox Rothschild LLP (57) ABSTRACT

Methods and systems are described for a folding tailgate. The system includes a first panel and a second panel forming a tailgate of the vehicle. The vehicle has a first vehicle sidewall and a second vehicle sidewall. The system may include a first hinge coupled between the first panel and the second panel. The first hinge is configured to rotate the second panel toward the first panel, moving the second panel towards the first vehicle sidewall for opening the tailgate sideways.

18 Claims, 7 Drawing Sheets

FOLDING TAILGATE FOR A VEHICLE

TECHNICAL FIELD

The present disclosure relates generally to vehicles, and more particularly, to a folding tailgate for a vehicle.

BACKGROUND

Truck beds carry cargo of various weights and sizes. Tailgates are a common feature on trucks that make loading and unloading the truck bed easier. Tailgates fold outwards from the truck and often align with the floor of the truck in a horizontal configuration. But this outward folding limits access to the bed of the truck especially near the cabin area. Consequently, reaching cargo is more difficult with the tailgate folded down. More worrisome, heavier objects may be placed closer to the cabin area, which results in increased difficulty in these harder-to-reach objects. Currently, consumers reach over the side of the pickup truck sidewalls or climb up in to the truck bed to access the cargo and harder-to-reach objects.

SUMMARY

The present disclosure provides methods, systems, articles of manufacture, a folding tailgate.

In one aspect, there is provided a tailgate opening system including a first panel and a second panel forming a tailgate of the vehicle. The vehicle has a first vehicle sidewall and a second vehicle sidewall. The first hinge is coupled between the first panel and the second panel. The first hinge is configured to rotate the second panel toward the first panel, moving the second panel towards the first vehicle sidewall for opening the tailgate sideways.

In some variations, the first panel and the second panel are in an upright orientation as the first hinge rotates the second panel toward the first panel. Further, the first panel and the second panel are releasably attached to a first vehicle sidewall and a second vehicle sidewall, respectively. Further, the first panel is configured to be selectively coupled to a second hinge at the first vehicle sidewall. Additionally, the second hinge is configured to rotate the first panel away from a vehicle bed as the first hinge rotates the second panel toward the first panel. In some variations, the second hinge is configured to rotate the first panel and the second panel as the first panel and the second panel are aligned with each other.

In some variations, the tailgate opening system further comprises a track extending along an edge proximate to a vehicle bed, a pivot hinge with a sliding mechanism, the sliding mechanism coupled to the track, and a linkage disposed at a bottom end of the second panel, the linkage configured to selectively couple to the pivot hinge. The linkage is disposed proximate to an end of the second panel farthest from the first panel. Further, the linkage of the second panel is configured to move with the pivot hinge and sliding mechanism across the track to move the second panel towards the first vehicle sidewall. Additionally, the linkage further includes a pin configured to be selectively inserted into an aperture at the pivot hinge. In some variations, wherein the track extends along a cross member between the first vehicle sidewall and the second vehicle sidewall, the cross member disposed below the vehicle bed. In some variations, the linkage of the second panel is configured to detach from the pivot hinge to move the second panel away from the vehicle bed.

In some variations, the tailgate opening system further comprises a latch configured to fold the first panel and the second panel down from a vertical orientation to a horizontal orientation in response to being manipulated, wherein the first panel and the second panel folds out over an axis proximate to a bottom edge of the first panel and the second panel. Additionally, the second panel is selectively coupled to a retractable cable to support the first panel and the second panel in the horizontal orientation, the retractable cable attached to the first vehicle sidewall. The retractable cable is selectively coupled to the second panel with a retractable pin.

In another aspect, there is a tailgate including a first panel and a second panel forming the tailgate for the vehicle. The vehicle may have a first vehicle sidewall and a second vehicle sidewall. The tailgate includes a first hinge coupled between the first panel and the second panel. The first hinge is configured to rotate the second panel toward the first panel, moving the second panel towards the first vehicle sidewall for opening the tailgate sideways.

In some variations, the first panel and the second panel are in an upright orientation as the first hinge rotates the second panel toward the first panel. Further, the first panel and the second panel are releasably attached to the first vehicle sidewall and the second vehicle sidewall, respectively. Additionally, the first panel is configured to be selectively coupled to a second hinge at the first vehicle sidewall. Further, the second hinge is configured to rotate the first panel away from a vehicle bed as the first hinge rotates the second panel toward the first panel. Additionally, the second hinge is configured to rotate the first panel and the second panel as the first panel and the second panel are aligned with each other. Further, the tailgate may include a linkage disposed at a bottom end of the second panel, the linkage configured to selectively couple to a pivot hinge on the vehicle.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes, it should be readily understood that such features are not intended to be limiting. The claims that follow this disclosure are intended to define the scope of the protected subject matter.

BRIEF DESCRIPTION OF THE DRAWINGS

The embodiments herein may be better understood by referring to the following description in conjunction with the accompanying drawings in which like reference numerals indicate identically or functionally similar elements, of which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiments are described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the embodiments. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" may be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

According to the present disclosure, a tailgate of a truck may include two side-by-side panels that are connected with a hinge. The hinge allows the two panels to fold together at the sides. At least one of the panels may slide sideways such that the tailgate slides to one side of the truck. Sliding the tailgate panels to one side of the truck enhances access to the truck bed. The tailgate may slide using a pivot hinge and linkages at the bottom of the tailgate. The pivot hinge may slide along a track running from one sidewall to the other sidewall. In comparison to single-panel tailgates that swing open, the folding panels may have a smaller footprint and may have a smaller range of motion. The folding panels accommodate limited spaces behind the truck for loading and unloading cargo.

The tailgate may include a hinge in the middle to fold two panels together. At least one of the panels may slide sideways as the two panels are folded together. The sliding assembly may include a pivot hinge, a sliding mechanism, and a sliding track. The sliding track may attach to a cross-member of the truck below the floor. The sliding track may be similar to a sliding track found on a van door. A sliding mechanism may be inserted into the track, which enables at least one of the panels to slide sideways as the two panels are folded together. The pivot hinge may be coupled to the sliding mechanism via linkages. A panel may be disconnected from the truck by detaching the linkages from the sliding mechanism. Disconnecting the panel may provide enhanced access to the truck bed.

The tailgate may fold down similar to a conventional tailgate on a truck. The truck may fold down about an axis near the bottom edge of the tailgate similar to conventional tailgates. The tailgate may include a latch to fold down the tailgate from a closed position similar to a conventional tailgate on a truck. The folding tailgate may have a pair of cables to support conventional tailgate opening. The cables may extend from the sides of the tailgate. The sides of the tailgate may include a retractable pin to allow the cables to detach from the tailgate. Detaching the cables from the tailgate may enable the tailgate to fold and open sideways. The cables may be retractable.

The methods, systems, apparatuses, and non-transitory storage mediums described herein fold a tailgate to the side to expand access to the truck bed. The various embodiments also enable the detachment of a panel of the tailgate for increased access to the truck bed.

Figure 1A:
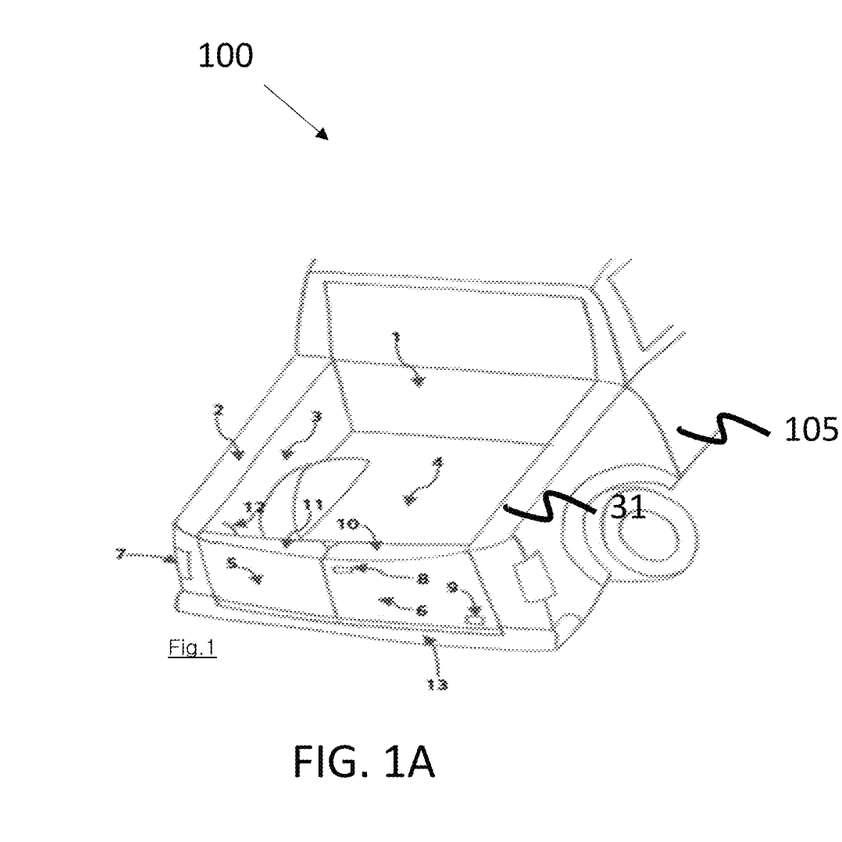
FIG. 1A depicts an example of a diagram representative of a tailgate opening system in an unfolded position.

FIG. 1A depicts an example of a diagram representative of a tailgate opening system 100 in a closed, unfolded position at a vehicle 105. The tailgate opening system 100 may include a left tailgate panel 5, a right tailgate panel 6, a first hinge 16 connecting the left tailgate panel 5 and the right tailgate panel 6, a first latch 8 for folding down the tailgate, and a second latch 9 for opening the tailgate sideways.

The tailgate opening system 100 may include the left tailgate panel 5 and the right tailgate panel 6 connected by the first hinge 16. The left tailgate panel 5 and the right tailgate panel 6 may be situated in an upright position. In the upright position, the left tailgate panel 5 and the right tailgate panel 6 secure the cargo in the vehicle 105. The left tailgate panel 5 and the right tailgate panel 6 may form a back wall for the vehicle to prevent the cargo from sliding out the back of the vehicle 105. The left tailgate panel 5 and the right tailgate panel 6 may be aligned. The alignment of the left tailgate panel 5 and the right tailgate panel 6 may make the tailgate 11 appear to be a single unit.

The tailgate opening system 100 may include a first latch 8 for folding down the tailgate 11. The first latch 8 may be positioned proximate to a middle of the tailgate 11. The first latch 8 may be manipulated in a similar fashion to a conventional tailgate in which the tailgate may be folded down over an axis by pulling on the first latch 8. Similarly, the tailgate 11 may be pushed up to an upright position and remain in the upright position by latching the tailgate 11 to the left sidewall 3 and the right sidewall 31.

The tailgate opening system 100 may include a second latch 9 for opening the tailgate 11 sideways. The second latch 9 may be located at the right tailgate panel 6. The second latch 9 may be located in a bottom right-hand corner of the right tailgate panel 6. Alternatively, the second latch 9 may be located at the left tailgate panel 5. The second latch 9 may be located in a bottom left-hand corner of the left tailgate panel 5. The second latch 9 may be enable the tailgate to be opened from side-to-side in a horizontal direction.

Figure 1B:
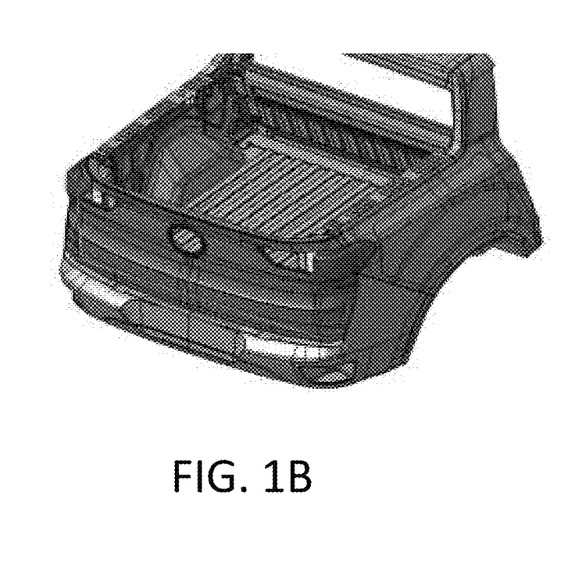
FIG. 1B depicts an example of drawing representative of a tailgate opening system in an unfolded position.

FIG. 1B depicts an example of drawing representative of a tailgate opening system 100 in a closed, unfolded position at a vehicle 105. The tailgate opening system 100 may include a left tailgate panel 5, a right tailgate panel 6, a first hinge 16 connecting the left tailgate panel 5 and the right tailgate panel 6, a first latch 8 for folding down the tailgate 11, and a second latch 9 for opening the tailgate 11 sideways.

The tailgate may be situated above a cross-member 13 of a vehicle 105. The tailgate 11 may include a lamp 7 on the left tailgate panel 5 and the right tailgate panel 6. In some embodiments, a tailgate 11 may be formed by the left tailgate panel 5 and the right tailgate panel 6. The left tailgate panel 5 and the right tailgate panel 6 may be situated between the left sidewall 3 and the right sidewall 31. The left tailgate panel 5 may be attached to a first vehicle sidewall and the right tailgate panel 6 may be attached to a second vehicle sidewall. The first vehicle sidewall may oppose the second vehicle sidewall. The left tailgate panel 5 may be a first panel and the right tailgate panel 6 may be a second panel. Alternatively, the right tailgate panel 6 may be a first panel and the left tailgate panel 5 may be a second panel. The first panel may be releasably attached to a left sidewall 3 and the second panel may be releasably attached to a right sidewall 31. Alternatively, the first panel may be releasably attached to a right sidewall 31 and the second panel may be releasably attached to a left sidewall 3. A first hinge 16 may couple between the left tailgate panel 5 and the right tailgate panel 6. The first hinge 16 may be configured to rotate the right tailgate panel 6 toward the left tailgate panel 5 thereby moving the right tailgate panel 6 towards the left vehicle 105 sidewall for opening the tailgate sideways.

In some embodiments, the left tailgate panel 5 and the right tailgate panel 6 may be in an upright orientation as the first hinge 16 rotates the right tailgate panel 6 toward the left tailgate panel 5. The left tailgate panel 5 may be configured to selectively couple to a second hinge 23 at the left sidewall 3. The left sidewall 3 may be the first vehicle sidewall and the right sidewall 31 may be the second vehicle sidewall. Alternatively, the right sidewall 31 may be the first vehicle sidewall and the left sidewall 3 may be the second vehicle sidewall. The second hinge 23 may be configured to rotate the left tailgate panel 5 away from the vehicle bed 4 as the first hinge 16 rotates the right tailgate panel 6 toward the left tailgate panel 5. In some embodiments, the second hinge 23 may be configured to rotate an aligned first panel and the second panel while the first hinge 16 remains immobile.

Figure 2:
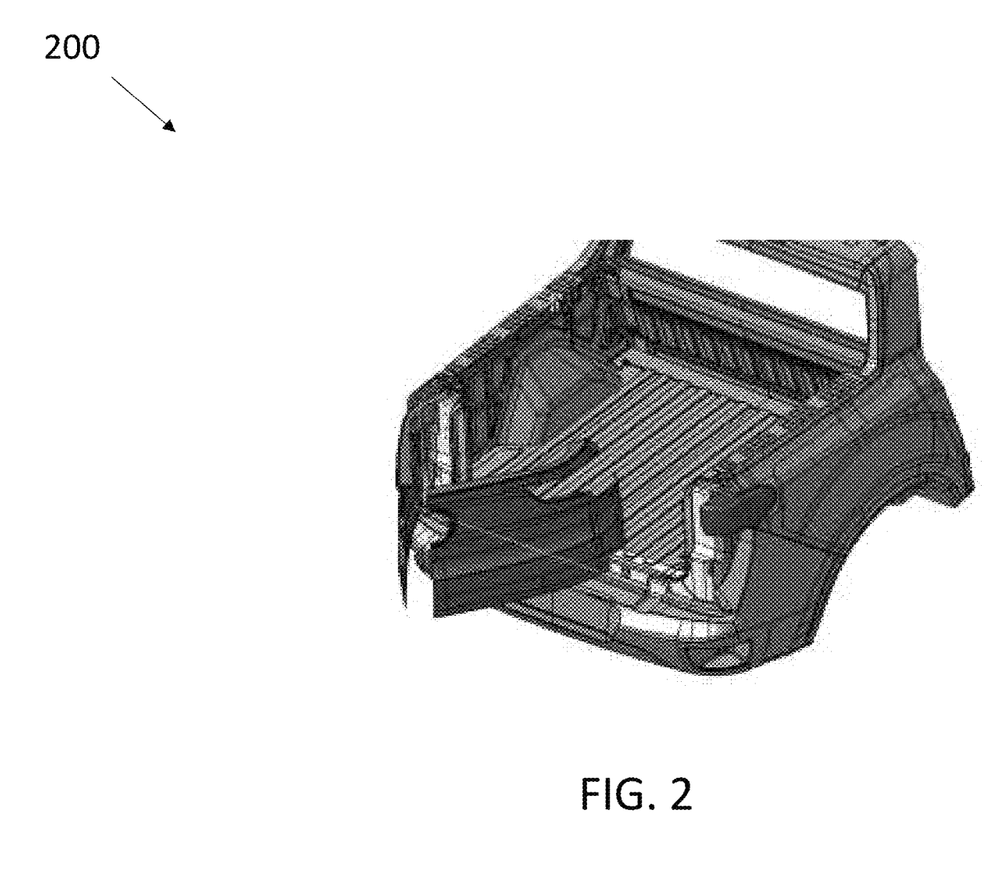
FIG. 2 depicts an example of drawing representative of a tailgate opening system in a partially folded position.

FIG. 2 depicts an example of drawing representative of a tailgate opening system 200 in a partially folded position at a vehicle 105. The tailgate 11 may transition between the closed position and the open position by sliding the left tailgate panel 5 and the right tailgate panel 6 together. The tailgate 11 may transition between the unfolded position and the folded position by sliding the left tailgate panel 5 and the right tailgate panel 6 together.

To move the tailgate 11 from the closed position to the open position, the second latch 9 may be used to open the tailgate 11 sideways. Pulling the second latch 9 may release a retractable pin 26 attached to the second latch. The first hinge 16 may begin to rotate the right tailgate panel 6 towards the left tailgate panel 5 as the right tailgate panel 6 slides across the sliding track 15 towards the left sidewall 3. The second hinge 23 may be configured to rotate the first panel away from a vehicle 105 bed 4 as the right tailgate panel 6 slides across the sliding track 15 towards the left sidewall 3. The right tailgate panel 6 may continue to move towards the left until the back side of the right tailgate panel 6 faces the back side of the left tailgate panel 5. The folded tailgate may be positioned at the left sidewall 3. Additionally, and/or alternatively, the left tailgate panel 5 may fold towards the right tailgate panel 6 such that the left tailgate panel 5 and the right tailgate panel 6 are folded together at the right sidewall 31.

To move the tailgate 11 from the open position to the closed position, the left tailgate panel 5 and the right tailgate panel 6 may be unfolded to form the back wall of the vehicle 105. The user may be required to pull the second latch 9 to unfold the right tailgate panel 6 from the left tailgate panel 5. The right tailgate panel 6 may be pulled towards the right sidewall 31. As the right tailgate panel 6 moves towards the right sidewall 31, the backside of the right tailgate panel 6 may be separated from the backside of the left tailgate panel 5. As the right tailgate panel 6 moves towards the right sidewall 31, the second hinge 23 may be configured to rotate the first panel toward the vehicle bed 4. As the right tailgate panel 6 moves towards the right sidewall 31, the first hinge 16 may be configured to rotate the right tailgate panel 6 away from the left tailgate panel 5. Additionally, and/or alternatively, the left tailgate panel 5 may fold away from the right tailgate panel 6 as the left tailgate panel 5 moves towards the left sidewall 3.

Figure 3A:
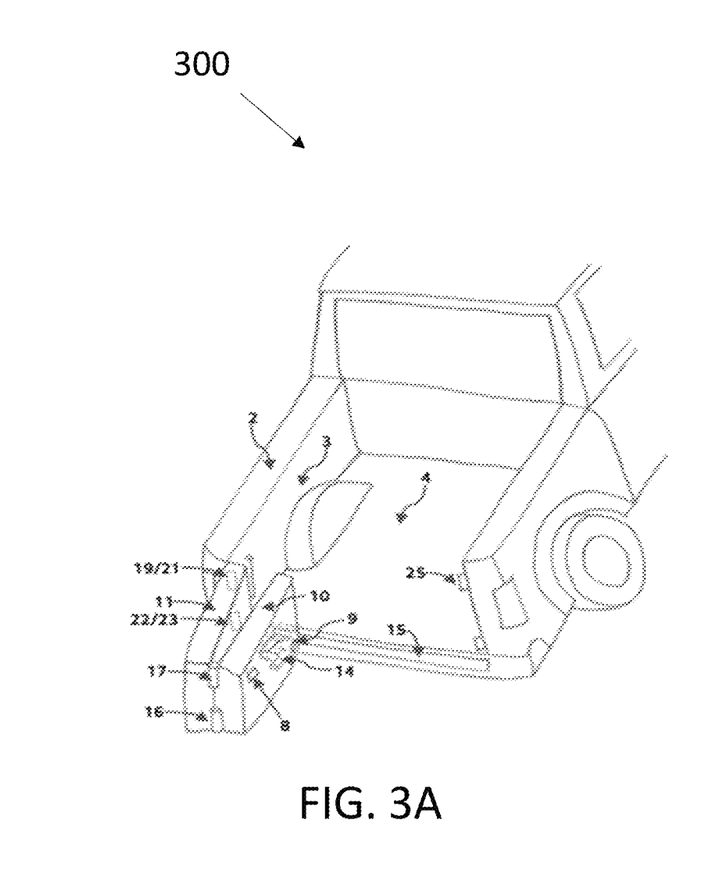
FIG. 3A depicts an example of a diagram representative of a tailgate opening system in a folded position.

FIG. 3A depicts an example of a diagram representative of a tailgate opening system 300 in a folded position at a vehicle 105. The tailgate opening system 100 may include a left tailgate panel 5, a right tailgate panel 6, a first hinge 16 connecting the left tailgate panel 5 and the right tailgate panel 6, a left sidewall 3 and a right sidewall 31, a first latch 8 for folding down the tailgate, a second latch 9 for opening the tailgate sideways, and a second hinge 23 connected to the left tailgate panel 5 and the left sidewall 3. In comparison to single-panel tailgates that swing open, the folding panels may have a smaller footprint and may have a smaller range of motion. The folding panels may accommodate limited spaces behind the vehicle for loading and unloading cargo.

The tailgate opening system 100 may include the left tailgate panel 5 and the right tailgate panel 6 connected by the first hinge 16. The left tailgate panel 5 and the right tailgate panel 6 may be situated in an upright position. The first hinge 16 may allow the left tailgate panel 5 and the right tailgate panel 6 to fold together sideways in the upright position. At least one of the panels may slide sideways such that the tailgate slides to a right sidewall 31 or a left sidewall 3 as it folds. Sliding the left tailgate panel 5 and the right tailgate panel 6 to one side of the vehicle 105 may enhance access to the vehicle bed 4. Sliding the left tailgate panel 5 and the right tailgate panel 6 may occur while the left tailgate panel 5 and the right tailgate panel 6 are in an upright position.

Figure 6:
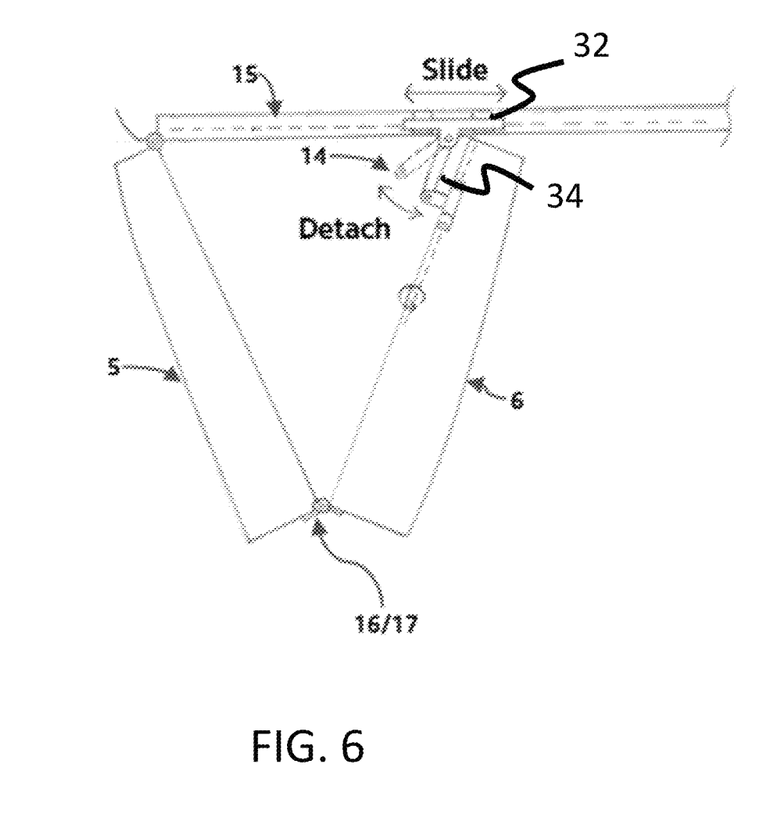
FIG. 6 depicts an example of a diagram representative of the sliding track, sliding mechanism, and pivot hinge at the bottom of the tailgate.

The tailgate opening system 100 may include a pivot hinge 34, a sliding mechanism 32, and a sliding track 15 (as shown in FIG. 6). The sliding track 15 may attach to a cross-member 13 of the vehicle 105 extending from the left sidewall 3 to the right sidewall 31. The cross-member 13 may be below the floor of the vehicle 105. The sliding track 15 may be similar to a sliding track 15 found on a van door.

The tailgate opening system 100 may include a sliding mechanism 32. The sliding mechanism 32 may be inserted into the sliding track 15, which enables at least one of the panels to slide sideways as the two panels are folded together. The sliding mechanism 32 may run along a sliding track 15 at a cross-member 13 of the vehicle 105 extending from the left sidewall 3 to the right sidewall 31.

The right tailgate panel 6 may include a pivot hinge 33. The right tailgate panel 6 may slide using a pivot hinge 33 connected to the sliding mechanism 32 via linkage 14 (as shown in FIG. 6). The left tailgate panel 5 may be coupled to a second hinge 23 at the first vehicle sidewall. The second hinge 23 may be configured to rotate the left tailgate panel 5 away from the vehicle bed 4 as the first hinge 16 rotates the right tailgate panel 6 toward the left tailgate panel 5. The first hinge 16 may rotate the right tailgate panel 6 toward the left tailgate panel 5 as the right tailgate panel 6 slides along the sliding track 15 via the sliding mechanism 32. A panel may be disconnected from the vehicle 105 by detaching the linkage 14 from the sliding mechanism 32. Disconnecting the panel may provide enhanced access to the vehicle bed 4.

Figure 3B:
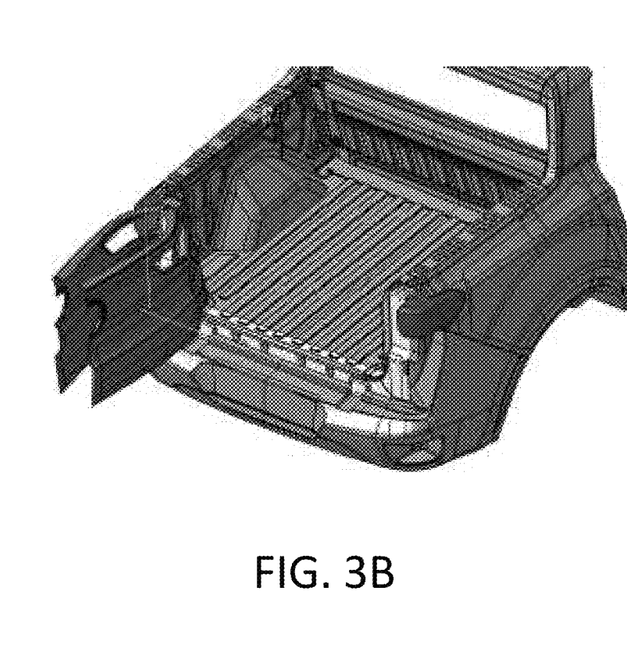
FIG. 3B depicts an example of drawing representative of a tailgate opening system in a folded position.

FIG. 3B depicts an example of drawing representative of a tailgate opening system 300 in an open and folded position in a vehicle 105. In comparison to single-panel tailgates that swing open, the folding panels may have a smaller footprint and may have a smaller range of motion. The folding panels may accommodate limited spaces behind the vehicle for loading and unloading cargo.

In some embodiments, the tailgate opening system 300 may include the left tailgate panel 5 and the right tailgate panel 6 to form a tailgate 11 of the vehicle 105. The left tailgate panel 5 and the right tailgate panel 6 may be situated between the vehicle sidewalls (i.e., the left sidewall 3 and the right sidewall 31). The first panel and the second panel may be releasably attached to a left sidewall 3 and a right sidewall 31, respectively. A first hinge 16 may couple between the left tailgate panel 5 and the right tailgate panel 6. The first hinge 16 may be configured to rotate the right tailgate panel 6 toward the left tailgate panel 5 thereby moving the right tailgate panel 6 towards the left vehicle 105 sidewall for opening the tailgate 11 sideways.

In some embodiments, the left tailgate panel 5 and the right tailgate panel 6 may be in an upright orientation as the first hinge 16 rotates the right tailgate panel 6 toward the left tailgate panel 5. The left tailgate panel 5 may be configured to selectively couple to a second hinge 23 at the first vehicle sidewall. The left sidewall 3 may be the first vehicle sidewall and the right sidewall 31 may be the second vehicle sidewall. Alternatively, the right sidewall 31 may be the first vehicle sidewall and the left sidewall 3 may be the second vehicle sidewall. The second hinge 23 may be configured to rotate the left tailgate panel 5 away from the vehicle bed 4 as the first hinge 16 rotates the right tailgate panel 6 toward the left tailgate panel 5. In some embodiments, the second hinge 23 may be configured to rotate the first panel and the second panel in an aligned configuration while the first hinge 16 remains immobile. The left tailgate panel 5 may be a first panel and the right tailgate panel 6 may be a second panel. Alternatively, the right tailgate panel 6 may be a first panel and the left tailgate panel 5 may be a second panel.

Figure 4A:
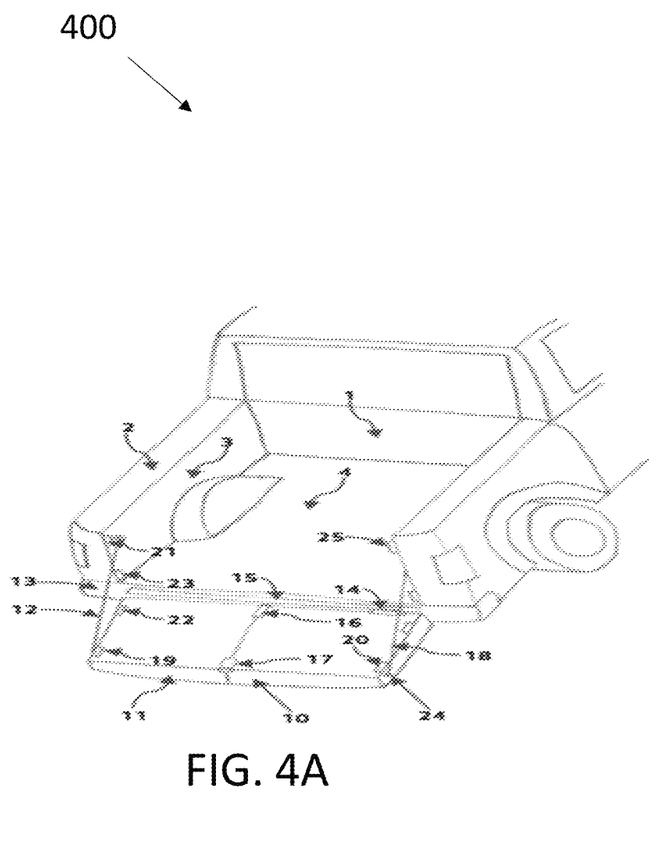
FIG. 4A depicts an example of a diagram representative of a tailgate opening system in a folded-down or horizontal configuration.

FIG. 4A depicts an example of a diagram representative of a tailgate opening system 400 in a folded-down or horizontal configuration at a vehicle 105. Similar to conventional tailgates, the folding tailgate may fold down to allow access to the vehicle bed 4. The detachable cable system may enable the folding tailgate to fold out and down and to also open sideways.

The left tailgate panel 5 and the right tailgate panel 6 may fold down and away from the vehicle bed 4. The left tailgate panel 5 and the right tailgate panel 6 may fold down about an axis near the bottom edge of the vehicle bed 4. The left tailgate panel 5 or the right tailgate panel 6 may include a first latch 8 (not shown in FIG. 4A) to fold down the tailgate from a closed, upright position to a horizontal position away from the front of the vehicle 105. When the left tailgate panel 5 and the right tailgate panel 6 are in the horizontal position extending away from the front of the vehicle 105, the left tailgate panel 5 and the right tailgate panel 6 may be supported by cable 18. The cable 18 may be attached to the right sidewall 31 and/or the left sidewall 3 of the vehicle 105. The cable 18 may be retractable. In at least one embodiment, the cable 18 retracts inside the right sidewall 31 and/or the left sidewall 3 of the vehicle 105 while the tailgate 11 is in an upright position.

The tailgate 11 may have a pair of cables 18 to support conventional tailgate opening. The cables 18 may extend from the sides of the tailgate 11. The right sidewall 31 and/or the left sidewall 3 of the tailgate 11 may include a retractable pin 26 to allow the cable 18 to detach from the tailgate 11. Detaching the cable 18 from the tailgate 11 may enable the tailgate 11 to fold and open sideways. The cable 18 may be retractable.

Figure 4B:
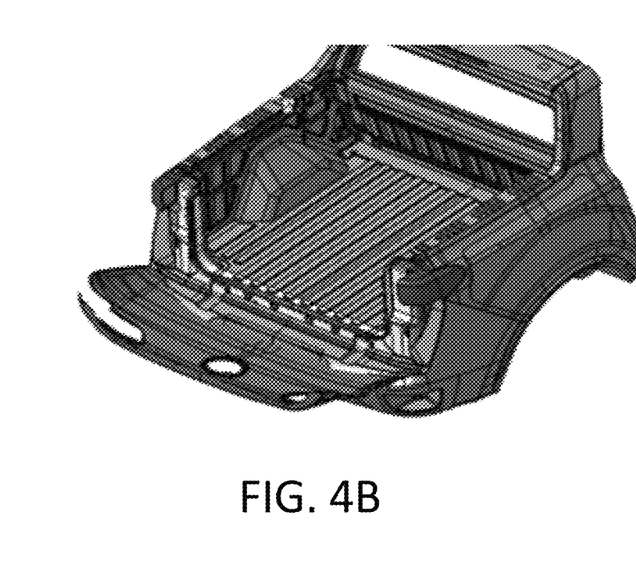
FIG. 4B depicts an example of drawing representative of a tailgate opening system in a folded-down or horizontal configuration.

FIG. 4B depicts an example of drawing representative of a tailgate opening system 100 in a folded-down or horizontal configuration in a vehicle 105. Similar to conventional tailgates, the folding tailgate may fold down to allow access to the vehicle bed 4. The cable may enable the folding tailgate to fold out and down and to also open sideways.

In some embodiments, a first latch 8 may be configured to fold the left tailgate panel 5 and the right tailgate panel 6 down from a vertical orientation to a horizontal orientation in response to being manipulated. The left tailgate panel 5 and the right tailgate panel 6 may fold out over an axis proximate to a bottom edge of left tailgate panel 5 and the right tailgate panel 6. The left tailgate panel 5 or the right tailgate panel 6 may be selectively coupled to a cable 18 to support the left tailgate panel 5 and the right tailgate panel 6 in the horizontal orientation, the cable 18 attached to the first vehicle sidewall (i.e., the right sidewall 31, the left sidewall 3).

Figure 5A:
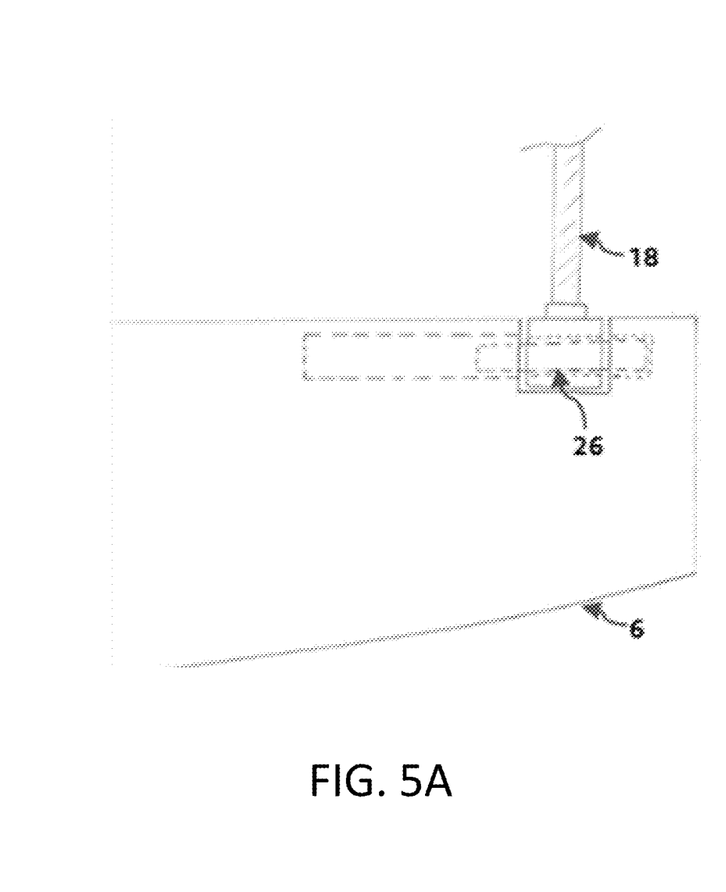
FIG. 5A depicts an example of a diagram representative of a cable and a retractable pin engaged with the tailgate to support conventional tailgate opening to a folded-down or horizontal configuration.

FIG. 5A depicts an example of a diagram representative of a cable 18 and a retractable pin 26 engaged with the tailgate 11 to support conventional tailgate opening to a folded-down or horizontal configuration. The folding tailgate may have a pair of cables 18 to support conventional tailgate opening. The cable 18 may secure the tailgate 11 to the vehicle 105 while the tailgate 11 is in the horizontal configuration extending away from the front of the vehicle 105. The cables 18 may extend from the sides of the tailgate (e.g., the right sidewall 31, the left sidewall 3). The sides of the tailgate 11 may include a retractable pin 26 to allow the cable 18 to attach to the tailgate 11. Selectively attaching the cable 18 may enable the tailgate to fold and open sideways. The cable 18 may be retractable.

The left tailgate panel 5 or the right tailgate panel 6 may include a recess 39. The recess 39 may be configured to receive a cable 18 end. The cable 18 end may be inserted into the recess 39. The cable 18 end may include an aperture 38. The recess 39 may also include a retractable pin 26 configured to fit inside the aperture 38 of the cable 18 end. The retractable pin 26 may be inserted into the aperture 38 at the cable 18 end. When inserted in the aperture 38, the retractable pin 26 secures the tailgate to the cable 18. Securing the retractable pin 26 in the aperture 38 may enable the tailgate to be secured in a horizontal position extending away from the front of the vehicle.

Figure 5B:
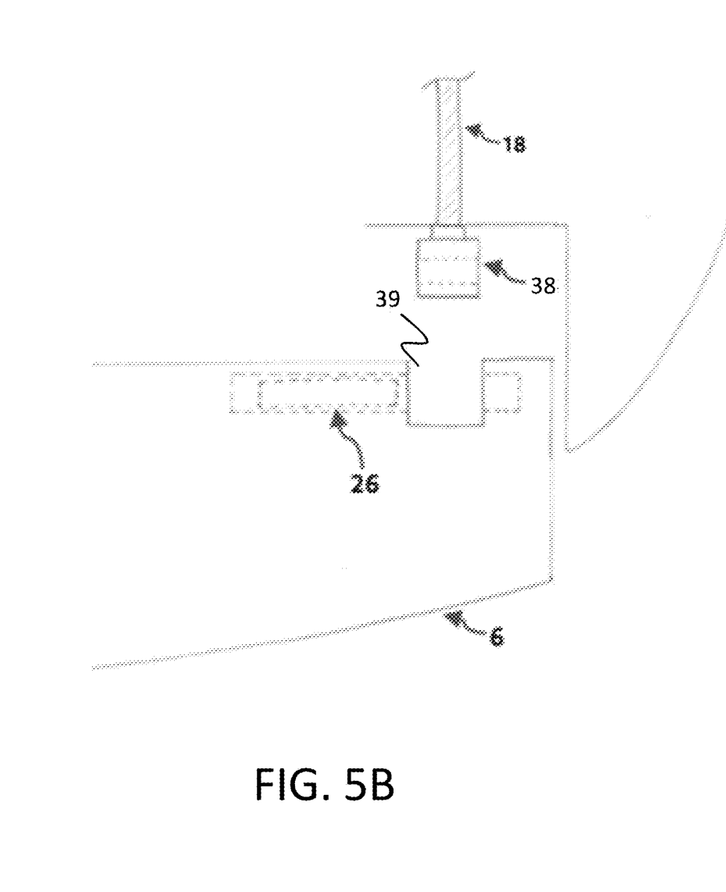
FIG. 5B depicts an example of drawing representative of a cable and a retractable pin disengaged with the tailgate to enable the tailgate to fold and open sideway.

FIG. 5B depicts an example of drawing representative of a cable 18 and a retractable pin 26 disengaged with the tailgate 11 to enable the tailgate 11 to fold and open sideway. The tailgate 11 may have a pair of cables to support conventional tailgate opening. The cable 18 may extend from the sides of the tailgate 11. The sides of the tailgate may include a retractable pin 26 to allow the cable 18 to detach from the tailgate 11. Detaching the cable 18 from the tailgate 11 may enable the tailgate 11 to fold and open sideways. The cable 18 may be retractable.

The left tailgate panel 5 or the right tailgate panel 6 may include a recess 39. The recess 39 may be configured to release a cable 18 end. The cable 18 end may be released from the recess 39. The cable 18 end may include an aperture 38. The recess 39 may also include a retractable pin 26 configured to be selectively removed from the aperture 38 of the cable 18 end. The retractable pin 26 may be selectively removed from the aperture 38 at the end of the cable 18. When the retractable pin 26 is removed from the aperture 38, the cable 18 may be detached from the tailgate 11. Detaching the retractable pin 26 from the aperture 38 may enable the tailgate 11 to open sideways.

FIG. 6 depicts an example of a diagram representative of the sliding track 15, sliding mechanism 32, and pivot hinge 33 at the bottom of the tailgate 11. A sliding assembly may include a pivot hinge 33, a sliding mechanism 32, and a sliding track 15. Disconnecting the panel may provide enhanced access to the vehicle bed 4.

A sliding track 15 may attach to a cross-member of the vehicle extending from the left sidewall 3 to the right sidewall 31. The cross-member 13 may be below the vehicle bed 4. The sliding track 15 may be similar to a sliding track 15 found on a van door. For example, the sliding track 15 may be an enclosed rectangular rail with an aperture 38 on the top face. The enclosed rectangular rail may be configured to receive the sliding mechanism 32. The sliding mechanism 32 may interface with the linkage 14 or the pivot hinge 33 through the opening on the top face.

The sliding assembly may include a sliding mechanism 32. The sliding mechanism 32 may be inserted into the sliding track 15, which enables at least one of the panels to slide sideways as the two panels are folded together in an upright position. The sliding mechanism 32 may run along a sliding track 15 at a cross-member 13 of the vehicle 105 extending from the left sidewall 3 to the right sidewall 31. The sliding mechanism 32 may include a wheel for smooth movement across the sliding track 15. The sliding mechanism 32 may include a hole, pin, or a fastener to couple with the pivot hinge 33.

The sliding assembly may include a pivot hinge 33. The pivot hinge 33 may be located at the right tailgate panel 6 or the left tailgate panel 5. The pivot hinge 33 may be positioned proximate to an end of the right tailgate panel 6 farthest from the left tailgate panel 5. Additionally, and/or alternatively, the pivot hinge 33 may be positioned proximate to an end of the left tailgate panel 5 farthest from the right tailgate panel 6. The pivot hinge 33 may slide with the sliding mechanism 32 via linkage 14. The pivot hinge 33 may be configured to rotate as the sliding mechanism 32 moves along the sliding track 15. In turn, the pivot hinge 33 may be configured to rotate as the right tailgate panel 6 or the left tailgate panel 5 slides along the sliding track 15. The pivot hinge 33 may be configured to disconnect from the linkage 14 and the sliding mechanism 32. For example, the pivot hinge 33 may disconnect from the sliding mechanism 32 by removing a bolt or a fastener from the linkage 14 and an aperture 38 in the pivot hinge 33. The linkage 14 may be configured to move with the pivot hinge 33 and sliding mechanism 32 across the track to fold the panels together.

In some embodiments, the tailgate opening system 100 may further comprise a track extending along an edge proximate to a vehicle bed 4. The tailgate opening system 100 may further comprise a pivot hinge 33 with a sliding mechanism 32, the sliding mechanism 32 coupled to the sliding track 15. The tailgate opening system 100 may further comprise a linkage 14 disposed at a bottom end of the second panel, the linkage 14 configured to selectively couple to the pivot hinge 33. The linkage 14 may be disposed proximate to an end of the second panel farthest from the first panel.

The linkage 14 of the second panel may be configured to move with the pivot hinge 33 and sliding mechanism 32 across the track to move the second panel towards the first vehicle sidewall (e.g., the left sidewall 3, the right sidewall 31). The linkage 14 may further include a pin configured to be selectively inserted into an aperture 38 at the pivot hinge 33.

Figure 7:
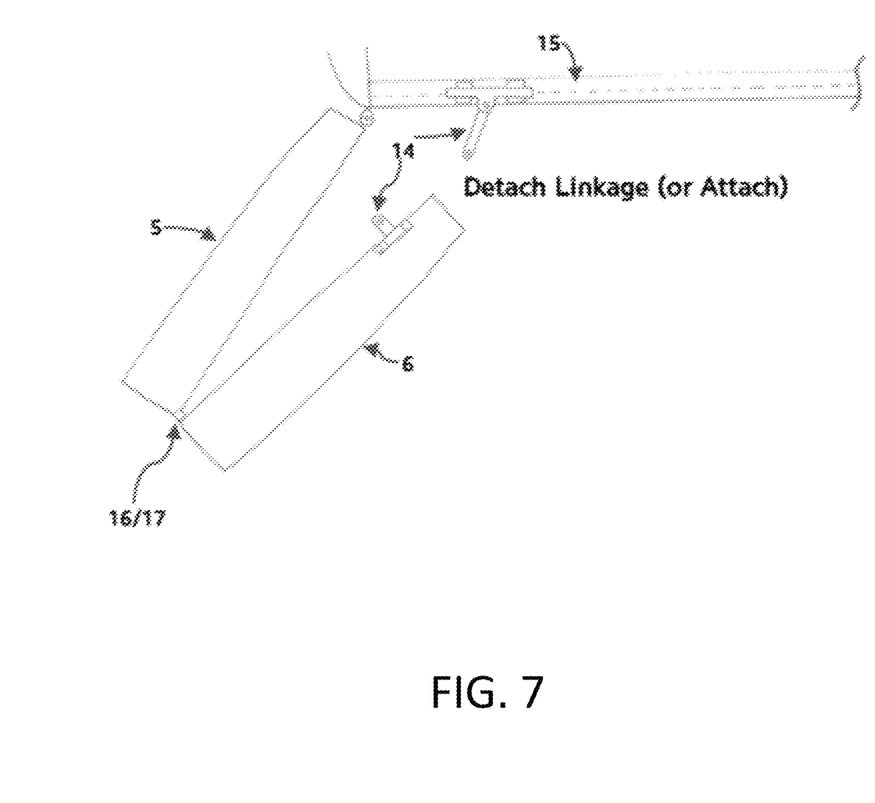
FIG. 7 depicts an example of a diagram representative of the pivot hinge detached from the sliding mechanism at the sliding track.

FIG. 7 depicts an example of a diagram representative of the pivot hinge 33 detached from the sliding mechanism 32 at the sliding track 15. The pivot hinge 33 may be detached from the sliding mechanism 32. Additionally, and/or alternatively, the left tailgate panel 5 or the right tailgate panel 6 may be detached from the pivot hinge 33 and the sliding mechanism 32.

Disconnecting the left tailgate panel 5 or the right tailgate panel 6 may provide enhanced access to the vehicle bed 4 by moving the left tailgate panel 5 and the right tailgate panel 6 away from the side of the vehicle 105. Further moving the left tailgate panel 5 and the right tailgate panel 6 away from the side of the vehicle 105 may include unfolding the left tailgate panel 5 and the right tailgate panel 6 away from each other and away from the side of the vehicle 105.

The tailgate opening system 100 may be enabled to detach the left tailgate panel 5 or the right tailgate panel 6 to the sliding mechanism 32 and/or pivot hinge 33. To detach the left tailgate panel 5 or the right tailgate panel 6, the linkage 14 and/or pivot hinge 33 may be disconnected from the sliding mechanism 32. The linkage 14 and/or pivot hinge 33 may be disconnected by removing a pin from an aperture 38 at the linkage 14 and/or pivot hinge 33. The disconnected panel may be unfolded from the panel connected to the second hinge 23 (e.g., the left tailgate panel 5 or the right tailgate panel 6). The disconnected panel and the panel connected to the second hinge 23 may rotate about the second hinge 23 out and away from the front and side of the vehicle. This results in enhanced access to the vehicle bed 4.

The tailgate opening system 100 may be enabled to reattach the disconnected panel (i.e., the left tailgate panel 5 or the right tailgate panel 6) to the sliding mechanism 32 and/or pivot hinge 33. To reattach the disconnected tailgate panel, the first hinge 16 may rotate the disconnected panel towards the panel connected to the second hinge 23. The disconnected panel and the panel connected to the second hinge 23 may rotate about the second hinge 23 towards the side of the vehicle 105 to bring the disconnected panel in contact with the linkage 14 and/or pivot hinge 33. To reattach the disconnected panel, the linkage 14 and/or pivot hinge 33 may be reconnected to the sliding mechanism 32. For example, the linkage 14 and/or pivot hinge 33 may be reconnected by inserting a pin into an aperture 38 at the linkage 14 and/or pivot hinge 33.

The technical advantages include sliding the tailgate panels to one side of the truck to enhance access to the truck bed. The tailgate may slide using a pivot hinge and linkages at the bottom of the tailgate. The pivot hinge may slide along a track running from one sidewall to the other sidewall. In comparison to single-panel tailgates that swing open, the folding panels may have a smaller footprint and may have a smaller range of motion. The folding panels accommodate limited spaces behind the truck for loading and unloading cargo.

The many features and advantages of the disclosure are apparent from the detailed specification, and thus, it is intended by the appended claims to cover all such features and advantages of the disclosure which fall within the true spirit and scope of the disclosure. Further, since numerous modifications and variations will readily occur to those skilled in the art, it is not desired to limit the disclosure to the exact construction and operation illustrated and described, and accordingly, all suitable modifications and equivalents may be resorted to, falling within the scope of the disclosure.

What is claimed is:

1. A tailgate opening system of a vehicle, the tailgate opening system comprising:
    a first panel and a second panel forming a tailgate of the vehicle, the vehicle having a first vehicle sidewall and a second vehicle sidewall;
    a first hinge coupled between the first panel and the second panel;
    a track extending along an edge proximate to a vehicle bed;
    a pivot hinge with a sliding mechanism, the sliding mechanism coupled to the track; and
    a linkage disposed at a bottom end of the second panel, the linkage configured to selectively couple to the pivot hinge;
    wherein the first hinge is configured to rotate the second panel toward the first panel, moving the second panel towards the first vehicle sidewall for opening the tailgate sideways.

2. The tailgate opening system of claim 1, wherein the first panel and the second panel are in an upright orientation as the first hinge rotates the second panel toward the first panel.

3. The tailgate opening system of claim 1, wherein the first panel and the second panel are releasably attached to the first vehicle sidewall and the second vehicle sidewall, respectively, and wherein the first panel is configured to be selectively coupled to a second hinge at the first vehicle sidewall.

4. The tailgate opening system of claim 3, wherein the second hinge is configured to rotate the first panel away from a vehicle bed as the first hinge rotates the second panel toward the first panel.

5. The tailgate opening system of claim 3, wherein the second hinge is configured to rotate the first panel and the second panel as the first panel and the second panel are aligned with each other.

6. The tailgate opening system of claim 1, wherein the linkage is disposed proximate to an end of the second panel farthest from the first panel.

7. The tailgate opening system of claim 1, wherein the linkage of the second panel is configured to move with the pivot hinge and sliding mechanism across the track to move the second panel towards the first vehicle sidewall.

8. The tailgate opening system of claim 1, wherein the linkage further includes a pin configured to be selectively inserted into an aperture at the pivot hinge.

9. The tailgate opening system of claim 1, wherein the track extends along a cross-member between the first vehicle sidewall and the second vehicle sidewall, the cross-member disposed below the vehicle bed.

10. The tailgate opening system of claim 1, wherein the linkage of the second panel is configured to detach from the pivot hinge to move the second panel away from the vehicle bed.

11. The tailgate opening system of claim 1, further comprising:
    a latch configured to fold the first panel and the second panel down from a vertical orientation to a horizontal orientation in response to being manipulated, wherein the first panel and the second panel folds out over an axis proximate to a bottom edge of the first panel and the second panel.

12. The tailgate opening system of claim 11, wherein the second panel is selectively coupled to a retractable cable to support the first panel and the second panel in the horizontal orientation, the retractable cable attached to the first vehicle sidewall.

13. The tailgate opening system of claim 12, wherein the retractable cable is selectively coupled to the second panel with a retractable pin.

14. A tailgate of a vehicle, the tailgate comprising:
    a first panel and a second panel forming the tailgate for the vehicle, the vehicle having a first vehicle sidewall and a second vehicle sidewall;
    a first hinge coupled between the first panel and the second panel; and
    a linkage disposed at a bottom end of the second panel, the linkage configured to selectively couple to a pivot hinge on the vehicle;
    wherein the first hinge is configured to rotate the second panel toward the first panel, moving the second panel towards the first vehicle sidewall for opening the tailgate sideways.

15. The tailgate of claim 14, wherein the first panel and the second panel are in an upright orientation as the first hinge rotates the second panel toward the first panel.

16. The tailgate of claim 14, wherein the first panel and the second panel are releasably attached to the first vehicle sidewall and the second vehicle sidewall, respectively, and wherein the first panel is configured to be selectively coupled to a second hinge at the first vehicle sidewall.

17. The tailgate of claim 16, wherein the second hinge is configured to rotate the first panel away from a vehicle bed as the first hinge rotates the second panel toward the first panel.

18. The tailgate of claim 16, wherein the second hinge is configured to rotate the first panel and the second panel as the first panel and the second panel are aligned with each other.

* * * * *